United States Patent Office 3,458,544
Patented July 29, 1969

3,458,544
PREPARATION OF SILVER SALTS OF ORGANIC CARBOXYLIC ACIDS
Thomas Toplica Bryan, White Bear Lake, Minn., assignor to Minnesota Mining and Manufacturing Company, St. Paul, Minn., a corporation of Delaware
No Drawing. Filed Sept. 17, 1965, Ser. No. 488,239
Int. Cl. C07f 1/10; C11c 3/00
U.S. Cl. 260—414          9 Claims

ABSTRACT OF THE DISCLOSURE

A process for preparing silver salts of organic carboxylic acids, such as silver behenate, in which an organic carboxylic acid dissolved in a water immiscible phase is admixed with an alkali soluble silver complex in an aqueous phase (pH at least 7.5) and recovering precipitated silver salt as a finely divided, highly pure, free-flowing product.

---

The new process in this invention relates to a process for the preparation of silver salts of organic acids. In one aspect this invention relates to a new process for the preparation of silver salts having particularly outstanding properties for use in image production processes. In another aspect the invention relates to silver soap in free flowing granular form of high purity.

Various silver soaps have been used in the manufacture of heat-sensitive copysheets suitable for use in conjunction with thermo-copying machines for duplicating office records and the like. For example, in the copysheets described in U.S. Patent No. 2,910,377 (Owen) various silver soaps may be incorporated into a visibly heat-sensitive layer having both an oxidizing and a reducing agent. Although silver behenate represents a preferred silver soap, other silver salts of organic acids have been utilized, including silver stearate and silver salts of oleic, lauric, hydroxystearic, acetic, phthalic, terephthalic, butyric, m-nitrobenzoic, salicylic, phenylacetic, pyromellitic, p-phenyl benzoic, undecylenic, camphoric, furoic, acetamidobenzoic, and o-amino benzoic acids. These silver soaps can serve as the reducible material in such copysheet constructions. Conventional procedures for the preparation of silver soaps generally have involved the solution reaction of silver nitrate with an inorganic salt of the organic acid in an aqueous medium in the presence of an acid, e.g. nitric acid, the resulting water insoluble precipitate being recovered on a filter and washed to produce the desired silver soap.

Silver soaps, such as silver behenate and silver stearate, are also employed in photosensitive copysheets of the type described in U.S. Patent No. 3,152,904. In these copysheets the silver soaps serve as suitable oxidizing agents and are preferably light insensitive. When such copysheets utilize transparent film backings and the resulting imaged sheet is intended to serve as a transparency for projection viewing or printing, it is desirable to minimize the presence of impurities which tend to cause sheet discoloration and "backgroundng." Furthermore, silver soap produced by conventional techniques normally required extended ball milling to obtain an intimate dispersion in solvents such as acetone and toluene. Efforts have been made to improve the form and purity of such silver soaps with the object of enhancing their performance in the above and other imaging processes.

It is an object of this invention to provide an improved process for preparing silver soap in the form of a fine, free flowing powder having a high surface area and in a high degree of purity.

Another object of this invention is to provide new and improved silver soaps having outstanding sensitometric and other performance properties when used in light and/or heat-sensitive copysheets.

A further object of this invention is to provide a simple and economic process for the preparation of high purity silver soaps of consistent quality with controllable particle size and which can be dispersed readily in solvent media without extended ball milling.

In accordance with this invention the above and other objects are realized by preparing an oil-in-water dispersion or emulsion having in the oil phase an organic acid, the silver salt of which is water insoluble, preferably a fatty acid, and in the aqueous phase an alkali soluble silver complex having a dissociation constant (to silver ion) greater than the silver salt of said organic acid, and agitating the dispersion, e.g. by homogenization, the pH of the aqueous phase being maintained above about 7.5. The water insoluble silver salt forms as a precipitate at the interface of the two immiscible phases and is recovered, usually by settling, filtration, washing with distilled water until the filtrate is free of undesired anions (including those introduced into the aqueous phase along with the silver) and drying. In general the average particle size of the oil phase in the dispersion is preferably maintained in the range of one to ten microns. The alkali soluble silver complex in the aqueous phase in preferably silver ammonium complex, although other silver complexes (silver amine complexes, such as the silver complexes of methyl amine or ethyl amine) can be used if they are alkali soluble (i.e. do not form insoluble silver compounds in alkaline media) and if their dissociation constant is higher than that of the desired water insoluble silver salt product.

The percent conversion to the desired silver salt increases with the increase in pH, and essentially complete conversion is obtained at a pH of 7.5 or above. The presence of an acid acceptor, such as ammonia, as part of the silver complex in the aqueous phase serves to neutralize the hydrogen ions as they are formed and hence direct the equilibrium toward the formation of the desired silver salt and to maintain the pH value above 7.5. When the silver complex does not produce an acid acceptor upon dissociation, a separate water soluble acid acceptor may be added to the aqueous phase to maintain the desired alkalinity. The final product is a free flowing powder having an average particle size between 5 and 50 microns and, accordingly, a high surface area per unit weight. Because of the fine particle size and high purity (usually at least 98 percent purity) of the insoluble silver salt product, it can be readily dispersed in a resin system without extended ball milling or grinding to produce a highly transparent coating when deposited onto a film base.

The process of this invention also permits the commercial synthesis of silver soaps in a continuous process, and the aqueous solution of silver complex and an oil-in-water emulsion of an organic acid (preferably behenic acid) can be reacted during mixing as they are fed simultaneously through a centrifugal pump, the product being thereafter filtered, washed and dried. By varying the flow rate of the two solutions and/or their relative concentration, silver soap of varying degrees of purity can be obtained. However, in general, with either a continuous or a batchwise process it is desirable to use approximately equivalent stoichiometric amounts of the reactants, i.e. water soluble silver complex and oil soluble organic carboxylic acid. The speed of the reaction can be effected within limits by regulating the temperature of the two-phase system in which the interfacial reaction takes place. Preferably temperatures of from about 20 to 70° C. are used, temperatures below 20° C. being suitable only if the lower rate of reaction can be tolerated and temperatures above 70° C. being useful only if the solvents employed are not lost by boiling. In some cases, elevated pressures may be useful.

The following example will illustrate the preparation of silver soap in accordance with this invention. A 0.01 molar solution of behenic acid in benzene is heated to 60° C. This solution is homogenized in an equal volume of water at 60° C. until the emulsion has an average particle size of 1 to 10 microns. To the resulting oil-in-water emulsion an equivalent stoichiometric amount of 0.1 normal aqueous silver ammonium nitrate solution having a pH of about 9 is added with stirring. The precipitate formed is allowed to settle, filtered using suction, washed with distilled water until the filtrate is free of nitrate ions, and then dried. Silver behenate product, analyzing 24.17 percent silver, is recovered in a yield of 98 percent.

Various other embodiments of the present invention will be apparent to those skilled in the art.

The embodiments of the invention in which an exclusive property or privilege is claimed are defined as follows:

1. A process for preparing water insoluble silver salt which comprises admixing a water immiscible phase containing an organic carboxylic acid dissolved therein, the silver salt of which is water insoluble, and an aqueous phase containing an alkali soluble silver complex having a dissociation constant higher than the silver salt of said organic acid, the pH of said aqueous phase being at least about 7.5, and recovering precipitated water insoluble silver salt of said organic carboxylic acid.

2. The process of claim 1 in which said alkali soluble silver complex is silver ammonium complex.

3. The process of claim 1 in which said organic carboxylic acid is a fatty acid.

4. The process of claim 1 in which said organic carboxylic acid is behenic acid.

5. The process of claim 1 in which said alkali soluble silver complex and said organic carboxylic acid are present in approximately stoichiometric proportions.

6. The process of claim 1 in which the average particle size of said water immiscible phase particles is in the range of one to ten microns.

7. A process for preparing silver soap from the reaction of a fatty acid and silver ion which comprises admixing a water immiscible solvent containing said fatty acid dissolved therein and an aqueous solution containing an alkali soluble silver complex having a dissociation constant higher than the silver salt of said fatty acid under conditions sufficient to provide water immiscible particles of 1 to 10 microns average size in said aqueous solution, adjusting the pH in said aqueous solution to a value of at least about 7.5, and recovering silver soap of said fatty acid in a high degree of purity.

8. The process of claim 7 in which said admixing is accomplished by homogenization.

9. The process of claim 7 in which the pH is adjusted by including a water soluble acid acceptor in the aqueous phase.

References Cited

UNITED STATES PATENTS 2,268,567   1/1942   Clayton et al. _____ 260—425

OTHER REFERENCES

Chemical Abstracts, vol. 55, col. 11156e, citing Belg. Pat. 591,479 (1960).

ALEX MAZEL, Primary Examiner

J. A. NARCAVAGE, Assistant Examiner

U.S. Cl. X.R.

96—94; 117—34; 260—430